Sept. 21, 1965          K. E. SUNDSTROM          3,207,996
                     SIGNAL COMPARISON CIRCUIT
Filed Nov. 17, 1961                              4 Sheets-Sheet 2

*INVENTOR.*
KARL ERIK SUNDSTROM
BY
ATTORNEY

United States Patent Office 3,207,996
Patented Sept. 21, 1965

3,207,996
SIGNAL COMPARISON CIRCUIT
Karl Erik Sundstrom, La Habra, Calif., assignor to Beckman Instruments, Inc., a corporation of California
Filed Nov. 17, 1961, Ser. No. 155,527
21 Claims. (Cl. 328—149)

The present invention relates to signal comparison circuits and, in particular, to signal comparison circuits finding useful adaptation to spectrophotometer apparatus.

In the art of spectrophotometry the "double beam" type of apparatus has been extensively utilized. In this apparatus a beam of radiation from a monochromator is alternately directed through a reference object and a sample object which has certain characteristics to be measured. Following its passage through the reference and sample objects the beam is directed to a radiation responsive device, such as a photocell, wherein the radiation impulses are converted to electrical impulses or signals. The signal voltages corresponding to the radiation intensities of the respective beams emanating from the sample and reference objects are separated; and, by means of a servo system, the ratio of the sample and reference object intensities is recorded in the form of a curve on graph paper, which is transported synchronously with wavelength changes from the monochromator.

In prior art spectrophotometers of the double beam type the radiation, in addition to being directed alternately to the sample and reference objects, is modulated at a relatively high frequency, usually by means of a mechanical "chopper." Utilization of such beam modulation requires rectification of the sample and reference object signals with diode rectifiers connected to operate as peak voltmeters and involves several disadvantages which will immediately appear to those skilled in the art. In such arrangements a capacitor is connected in circuit with each diode such that charging of the capacitor by the respective signals is accomplished through the low internal resistance of the diode. On the other hand, discharge of the capacitor, which is essential for determining the signal magnitude, takes place through a series resistance of comparatively high value. The speed of response, therefore, depends upon the discharge time constant for the respective capacitors while the signal-to-noise ratio depends upon the charging time constant.

According to one aspect of the present invention, which will be more fully disclosed hereinafter, the disadvantages of the prior art spectrophotometer devices are avoided by providing a radiation alternation device or chopper which has an opaque sector that blocks or cuts off the beam of radiation once or twice during each alternation cycle. Synchronously with the beam alternation a pulse separation takes place so that the signal voltages corresponding to the reference and sample object intensities are distributed to different signal processing circuits. This pulse or signal separation takes place in such a way that the charge and discharge time constants for sample and reference object circuits are nearly equal, which means that the highest possible speed of response with optimum signal-to-noise ratio can be achieved.

The sample object is usually an aqueous solution the transparency or absorption of which is to be measured; whereas the reference object is usually composed of pure solvent. With the help of a spectrophotometer, according to the invention, different solutions or different concentrations of the same solution can be analyzed or confirmed by direct comparison between the measuring curves. The invention, however, can also be used for the measurement of reflection coefficients in differently constituted surfaces, whereby the intensity of the reflected radiation from a sample object is measured in analogous fashion by a comparison with the reflection from a reference surface.

The features of the invention desired to be protected herein are pointed out with particularity in the appended claims. The invention itself, together with further objects and advantages thereof, may best be understood by referring to the following description taken in connection with the accompanying drawings in which:

Figure 1:
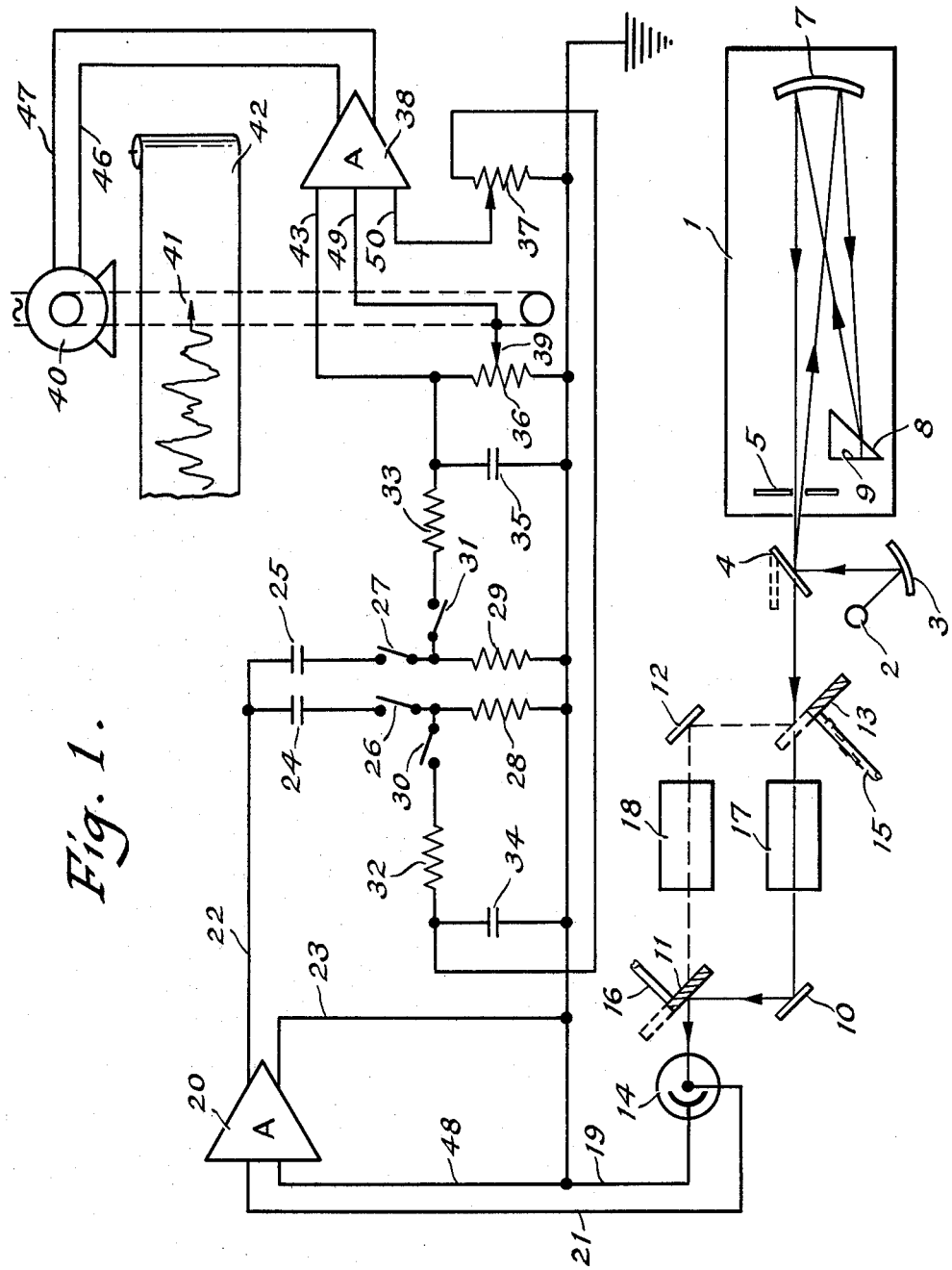
FIG. 1 is a schematic and diagrammatic illustration of a signal comparison circuit according to the invention which is adapted for utilization in connection with spectrophotometer apparatus.

Referring particularly now to FIG. 1, a monochromator 1 is shown in diagrammatic form. The radiation from a source 2, which in some cases may consist of an ordinary incandescent lamp, is reflected by mirrors 3 and 4 against an opaque plate 5 provided with a slit as illustrated. Through this slit passes a beam of radiation which is reflected from a concave, spherical mirror 7 to a prism 8 with mirror coating 9. The beam is then refracted in the prism, reflected against the coating 9, returned to mirror 7 and focused on the inside of plate 5, whereby another part of the slit therein permits a portion of the radiation to emerge from the monochromator.

The beam radiation issuing through the exit slit of plate 5 is then reflected by a mirror system, comprising four mirrors, to the radiation responsive surface of a device such as photocell 14. Mirrors 10 and 12 are fixed while mirrors 11 and 13 are rotated synchronously with shafts 15 and 16, in such a way that either mirror 13 is in the path of the beam and mirror 11 is turned out of the latter (dashed line in the figure), or mirror 11 is in the path of the beam while 13 is turned away (in continuous line in the figure).

In the path of the beam, between the mirrors, there are placed a reference object 17 and a sample object 18. In the example shown these objects consist of glass cells. The reference cell may, for example, contain pure water, while the sample cell 18 may contain a solution to be measured for light transmission and absorption power. For a purpose and in a manner which will be more fully explained hereinafter in connection with FIG. 4, the two cells are placed in such a way among the mirrors 10, 11, 12 and 13, that the sample cell is in the radiation path between the mirrors during time $t_3$–$t_4$ thereby causing a sample pulse to be emitted by the detector, the reference cell is in the radiation path during the time $t_2$–$t_3$ thereby causing a reference pulse to be emitted, and during time $t_1$–$t_2$, the ray path is barred by an opaque sector of the mirror 13, thereby causing a blanking level or pulse to be the detector's only output.

The cathode of photocell 14 is grounded through a lead 19, while the collector electrode or anode is connected to the input of a measuring amplifier 20 through a lead 21. The return of the amplifier is grounded through a lead 48. One output lead of the measuring amplifier is connected to ground, the other lead to two coupling capacitors 24 and 25 having the same capacitance. The measuring amplifier 20 is provided to amplify a suitable amount the signal voltages generated in the circuit of photocell 14 by the radiation impulses impinging on the cathode thereof. Since it is important that the amplification take place without distortion of the signal waveform, a so-called wide band amplifier, which has an essentially constant response over a wide frequency band, is preferred for amplifier 20.

Coupling condensers 24 and 25 are connected respectively to commutator switches 26 and 27, which consist of contacts driven by cams placed on the mirror-rotation shaft 15. Commutator switches 26, 27, which may be conventional cam-driven microswitches of suitable current-carrying capacity, are grounded through the equal resistances 28 and 29. A pair of commutator switches 30 and 31 connect the commutator switches 26 and 27 respectively to equal resistances 32 and 33. Resistance 32 is connected in series with a capacitor 34, which is connected in parallel with a grounded resistance 37. Resistance 33 is connected in series with a capacitor 35, which is connected in parallel to a grounded resistance 36.

Commutator switches 30 and 31, like commutator switches 26 and 27, are driven by cams placed on the mirror rotation shaft 15. In driving the commutator switches 26, 27, 30 and 31 by cams on the mirror-rotation shaft 15, the switching is made synchronous with the radiation beam alternation.

Resistance 36 comprises a potentiometer, the movable contact 39 of which is connected to one input of a suitable servo amplifier 38 by means of an input lead 49, while its other input is connected to the movable contact of adjustable resistance 37 by means of an input lead 50. The output of the servo amplifier is connected to a two-phase power servo motor 40, which is mechanically linked in such a way with the movable contact 39 on the potentiometer 36 and the pen 41 of a recorder (not illustrated) that rotation of the armature of the motor moves potentiometer contact 39 and at the same time moves the pen 41 on the chart paper 42 of the recorder into a position which corresponds to the position of contact 39 on potentiometer 36. Chart paper 42 is transported in a direction perpendicular to the direction of movement of pen 41 at a rate corresponding at all times to the variation in radiation wave length emitted from the monochromator.

A voltage is fed from the junction of resistance 33 and potentiometer 36 to the servo amplifier 38 by lead 43. By means of this voltage, the gain of the servo amplifier is regulated so that it always has a value favorable to its proper function, independent of the actual voltage across the resistance 36. The gain of the servo amplifier may be made variable, as is known to those skilled in the art, by using as the input tube a pentode (not shown) with variable mu, the grid voltage of which includes the voltage across resistance 36.

The servo amplifier 38 responds to a difference in magnitude and sign between the voltage on lead 50 from resistance 37 to one input of the amplifier, and the voltage on the moving contact 39 on resistance 36 and the lead 49 to the other input of the amplifier. A voltage difference between leads 49 and 50 is changed in the input circuit of the amplifier to alternating current, the phase of which, with respect to the line voltage, depends on the sign of the said voltage difference such that a reversal of the sign of the input voltage results in a phase change of 180°. The output of the servo amplifier supplies, through leads 46 and 47, a two-phase motor 40, the armature of which rotates in a direction dependent upon the phase position of the applied voltage relative to the line voltage which supplies one of the two-phase windings of the motor.

Figure 2:
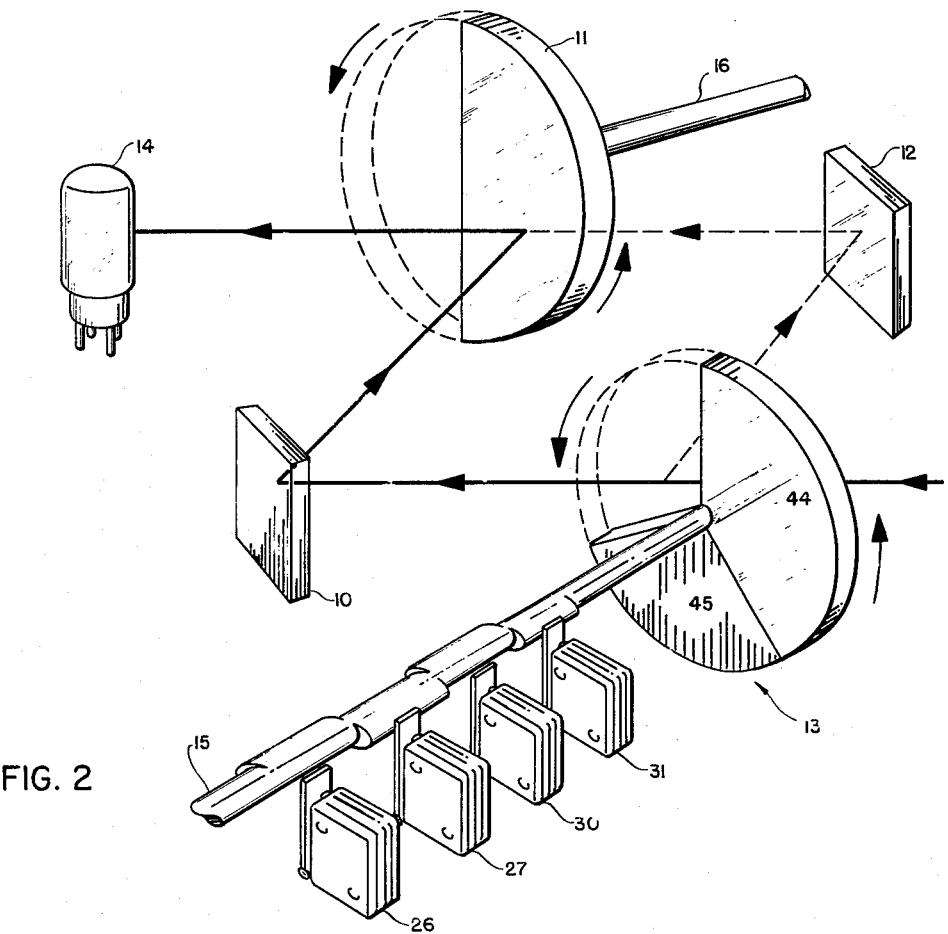
FIG. 2 is a somewhat further detailed diagrammatic illustration of the apparatus illustrated in FIG. 1.

FIG. 2 is a more detailed showing of the ray path between mirrors 10, 11, 12, and 13 and illustrates one form of the rotating mirror 13 according to the present invention. Mirror 11 comprises a 180° sector surface fastened at its center, perpendicular to a rotating shaft 16 with which it is made to rotate. In the form shown in FIG. 2, the mirror 13 comprises a 120° reflecting surfaced sector 44 fastened at the center, perpendicular to a rotating shaft 15 with which it is made to rotate. Adjoining sector 44 is a 120° opaque sector 45. The commutator switches 26, 27, 30 and 31 are driven by suitable cams on rotating shaft 15 as schematically illustrated in FIG. 2.

Figure 4:
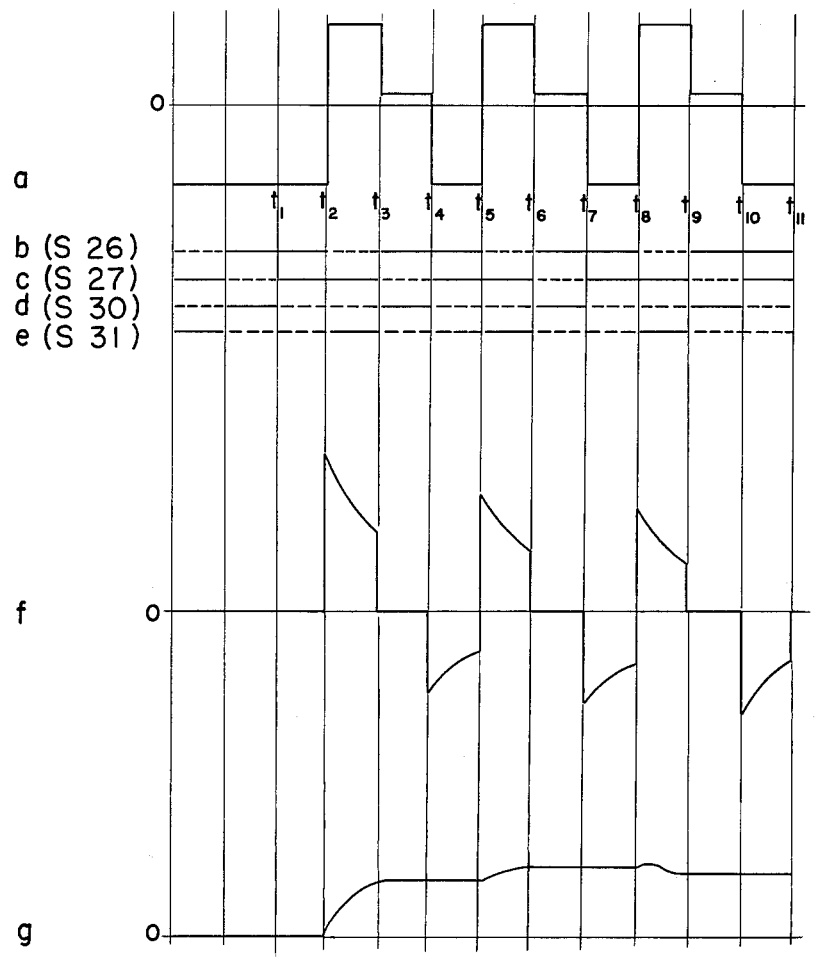
FIG. 4 illustrates waveforms present at various points and timing cycles of the switches employed in the circuit of FIG. 1, when the rotating mirror shown in FIG. 2 is utilized.

Referring now to FIG. 4, the operating cycles of the commutator switches with respect to the rotation of the mirrors may conveniently be seen. In this figure, FIG. 4a illustrates the waveform appearing at the output of the amplifier 20; FIG. 4b indicates the operation of the commutator switch 26; FIG. 4c indicates the operation of the commutator switch 27; FIG. 4d indicates the operation of the commutator switch 30; FIG. 4e indicates the operation of the commutator switch 31; FIG. 4f illustrates the waveform appearing at the junction of switches 27 and 31; and FIG. 4g illustrates the waveform appearing across the resistance 36. In FIGS. 4b, c, d, and e, a solid line indicates that the switch is closed, while a dotted line indicates that the switch is open.

During time $t_1$–$t_2$ the ray path is blocked by sector 45 and commutator switches 26, 27 are closed but switches 30, 31 are not. During $t_2$–$t_3$, sectors 44 and 45 of mirror 13 are turned out of the ray path so that the radiation from the monochromator strikes solid mirror 10 and is directed toward mirror 11, which is in such a position that its reflective sector reflects the radiation into photocell 14. During this time the commutator switches 27, 31 are closed but switches 26, 30 are not. During time $t_3$–$t_4$ mirror 13 is in such a position that the radiation is reflected from reflecting surface 44 against the stationary mirror 12 which reflects it into photocell 14 past mirror 11 which now is turned out of the ray path. During this time commutator switches 26, 30 are closed but switches 27, 31 are not. During time $t_4$–$t_5$ the operation that was performed during time $t_1$–$t_2$ is repeated and therewith begins a new measuring cycle.

FIG. 4a shows an example of the waveform of the output voltage from the photocell. The lowest levels or blanking pulses marked $t_1$–$t_2$, $t_4$–$t_5$ and $t_7$–$t_8$ correspond to the time the ray path is blocked by opaque sector 45 on mirror 13. The highest levels or reference pulses marked $t_2$–$t_3$, $t_5$–$t_6$ and $t_8$–$t_9$ correspond to the radiation intensity transmitted by the reference cell in which absorption is caused only by pure solvent. The intermediate levels or sample pulses marked $t_3$–$t_4$, $t_6$–$t_7$ and $t_9$–$t_{10}$ correspond to the radiation intensity transmitted by the sample cell in which absorption is caused both by the solvent and sample material dissolved therein.

The operation of the signal comparison circuit discussed above will now be described, with references made to the waveforms shown in FIG. 4. Throughout the description of the operation, it will be assumed that the monochromator is set at a given radiation wave length. Only the effect of a reference pulse upon the system will be described, as the effect of the sample pulse is similar and will be obvious to those skilled in the art.

Let it be assumed that the mirror 13 is so positioned that the opaque portion 45 of the mirror blocks the beam and the only output of the detector 14 is its dark current. The voltage corresponding to this current forms a blanking pulse which is amplified by the amplifier 20. Since the switch 27 is closed at this time, the blanking pulse is impressed across the capacitor 25 and resistance 29, and the capacitor 25 charges to the voltage of the amplifier output, the voltage at the junction of the switches 27 and 31 dropping to ground potential. This is the situation at time $t_1$ in FIG. 4f. At time $t_2$, the mirror 13 has rotated to a position where the radiation beam passes through the reference cell 17 and thence to the mirrors 10 and 11 and the detector 14. The cams on the rotating shaft cause the switches 26 and 30 to be open and switches 27 and 31 to be closed.

The output of the amplifier 20 now changes in magnitude from the level of the blanking pulse to the level of the reference pulse and the voltage at the junction of switches 27 and 31 rises an equal amount. The capacitor 25 now begins to charge and the voltage at the switch junction declines exponentially during the period $t_2$–$t_3$ as can be seen in FIG. 4f. At time $t_3$, the switch 27 opens and the voltage at the switch junction drops to ground as the capacitor is no longer connected to it. During period $t_3$–$t_4$, the switch 27 remains open and the voltage at the switch junction remains at ground.

At time $t_4$, the mirror 13 has rotated to a position where the opaque portion 45 has blocked the beam and the switch 27 has closed. The voltage at the switch junction now drops to a negative value due to the sign of the charge on the capacitor 25. During the period $t_4$–$t_5$, the capacitor 25 discharges through the resistance 29 with the result that the voltage at the switch junction rises exponentially during this period.

At time $t_5$ the reference pulse again appears at the output of the amplifier 20 and the switch 27 remains closed with the result that the voltage at the switch junction rises in the same fashion as happened at time $t_2$. At time $t_5$, however, the voltage at the switch junction does not rise as high as it did at time $t_2$ since it did not start at ground but rather at a negative potential.

This switching operation is repeated as the mirror revolves until the positive and negative going excursions shown in FIG. 4f are symmetrical around ground potential. A reference signal compared to a known, fixed reference potential has thus been obtained. In the same fashion, the opening and closing of the switch 26 establishes a sample signal at the junction of switches 26 and 30 that is a certain voltage higher than the same known, fixed reference potential, i.e., ground. This sample signal is, of course established during the periods $t_3$–$t_4$, $t_6$–$t_7$, $t_9$–$t_{10}$, etc.

In the foregoing it has been assumed that the influence of the switch 31, resistor 33 and capacitor 35 on the intermediary waveform at the junction of the switches 27 and 31 is negligible. This is true to a close approximation when resistor 33 is selected to have a very high value in comparison with resistor 29.

As may be seen from FIGS. 4d and 4e, switches 30 and 31 are closed during the periods that the first and second signal trains made up of the reference and sample signals are positive and therefore act as synchronous rectifiers. The RC circuits 32, 34 and 33, 35 filter the signals selected by the synchronous rectifiers 30 and 31. Stated differently, the RC circuits 32, 34 and 33, 35 act as integrator circuits. FIG. 4g shows the waveform appearing across the capacitor 35, from which it is apparent that the voltage of the waveform at the junction of switches 27 and 31 is integrated by the RC combination 33 and 35 to form a close approximation of what would ideally be a square wave. The same integration takes place in the RC circuit 32, 34 with the result that two approximately square waves which are proportional to the intensity of the light beams passing through the reference and sample cells are impressed across the resistors 36 and 37.

Servo amplifier 38 responds to the voltage difference between its inputs to which leads 49 and 50 are connected and converts this voltage difference into a proportional alternating current which, after amplification, drives servo motor 40. Rotation of the armature of servo motor 40, which may be mechanically coupled to movable contact 39 of the potentiometer 36 by means of suitable gears and cables well known to those skilled in the art, adjusts movable contact 39 to such a position that the voltage input to amplifier 38 is substantially zero.

The process described is repeated with continuing alternation of the radiation as long as the monochromator is adjusted to the same wave length. On changing the wave length by rotation of prism 8, the change of radiation intensity, partly as a result of changed total intensity from the monochromator and changed sensitivity in the photocell, and partly as a result of changed absorption in the reference and sample cells, causes the voltage from photocell 14 to be changed and therefore the voltage from the amplifier 20. After separation of the reference and sample signal pulses in the commutator switch combination 26, 27, 30 and 31, capacitors 34 and 35 are respectively charged to the new voltages which are proportional to the radiation intensities transmitted by the reference and sample cells. The voltage changes across the capacitors 34 and 35 result in changes of signals to servo amplifier 38 input, causing motor 40 to move contact 39 to such a position that balance occurs, that is to say, until voltage equality at the input to the servo amplifier is obtained.

With continuing change in the wave length of the radiation, there is a continuing movement of chart paper 42, and with movement of contact 39 on the potentiometer 36 there is a corresponding movement of pen 41. With variation of the radiation wave length there occur concomitant variations in the intensities of radiation transmitted by the reference and sample cells and resultant variations in the voltages across the capacitors 34 and 35. Servo amplifier 38 and servo motor 40 produce a continuous movement of contact 39 so that substantial balance is continuously maintained at the servo amplifier input. Pen 41 is thereby caused to draw a continuous curve which represents the transmission characteristics of the sample relative to that of the reference as a function of the radiation wave length.

Figure 3:
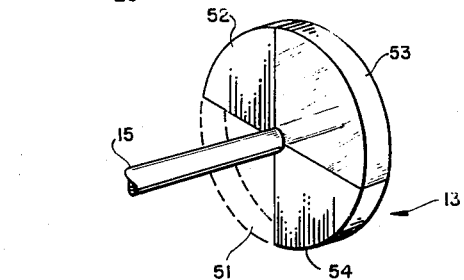
FIG. 3 shows a second embodiment of a rotating mirror suitable for use with the aparatus of FIG. 2.

Referring now to FIG. 3, there is shown another embodiment of a rotating mirror 13 which may be used in conjunction with the apparatus and circuit of the present invention. In this embodiment, the mirror 13 is divided into four quadrants 51, 52, 53 and 54. Quadrant 51 is open or is constructed of translucent material, quadrants 52 and 54 are opaque, and quadrant 53 is occupied by a mirror portion similar to the portion 44 of the mirror assembly shown in FIG. 2. With the use of this rotating mirror, each cycle is divided into four periods rather than the three resultant from the use of the mirror assembly shown in FIG. 2.

Figure 5:
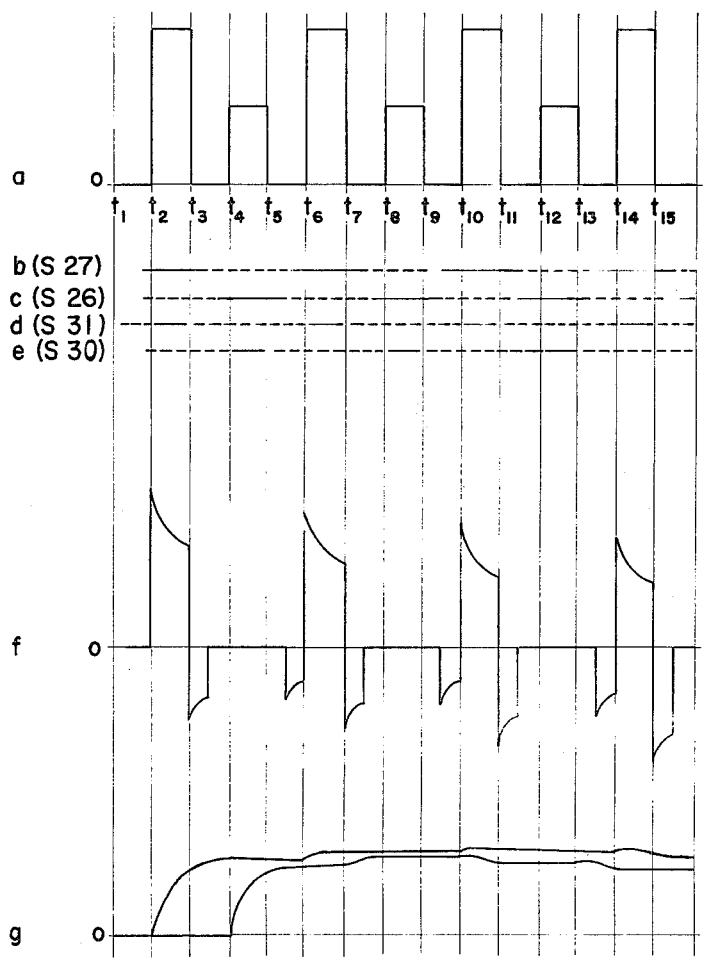
FIG. 5 illustrates waveforms present at various points and timing cycles of the switches employed in the circuit of FIG. 1, when the rotating mirror shown in FIG. 3 is utilized.

In the first period of the cycle, the radiation beam from the monochromator passes through the open or translucent quadrant 51, through the reference cell 17 to the mirror 10 and thence to the mirror 11 and detector 14. In the second period of the cycle, the radiation beam is blocked from reaching the detector 14 by the quadrant 52. In the third period of the cycle, the radiation beam is reflected from the mirror portion 53 to the mirror 12, and thence through the sample cell 18 and the open portion of the rotating mirror 11 to the detector 14. In the fourth period of the cycle, the beam is again blocked from reaching the detector 14, this time by the opaque quadrant 54. The shaft 15 is again provided with a plurality of cams which operate the commutator switches 26, 27, 30 and 31 in a manner shown in FIG. 5. FIG. 5 also shows the waveforms present at the amplifier output, the junction of the switches 27, 31, and across the resistor 36.

The operation of the circuit of FIG. 1 when it includes a rotating mirror such as that shown in FIG. 3 is similar to its operation when it includes the rotating mirror of FIG. 2, the only difference being in the switching cycles of switches 26, 27, 30 and 31. The operation of the circuit can best be explained by referring to FIG. 5. In this figure, as in FIG. 4, the solid lines indicate that a switch is closed and the dotted lines indicate that a switch is open.

As can be seen from an inspection of FIGS. 5a and 5b, the switch 27 is closed a short time before the appearance of a reference pulse, remains closed during the time that the reference pulse is present, and opens a short time after the reference pulse is removed. The switch 26 is closed a short time before the appearance of a sample pulse, remains closed during the time that the sample pulse is present, and opens a short time after the sample pulse is removed.

The switch 31 closes a short time after the appearance of a reference pulse and is opened a short time before the reference pulse is removed. The switch 30, on the other hand, closes a short time after the appearance of a sample pulse and opens a short time before the sample pulse is removed.

As was the case with FIG. 4, only the effect of the reference pulse on the circuit will be described, as the action of the sample pulse is similar and will be apparent to those skilled in the art. It will again be assumed that the cycle starts with the opaque sector 54 of the mirror 13 blocking the beam of radiation and the voltage at the junction of the switches 27 and 31 being at ground potential due to the capacitor 25 being charged to the magnitude of the dark current or blanking pulse. This condition is shown at $t_1$ in FIG. 5f. At times $t_2$, the mirror 13 has rotated counterclockwise so that the translucent quadrant 51 is in the path of the radiataion beam with the result that the beam passes through the reference cell 17, to the mirror 10, and then to the detector 14. At this time, the switch 27 is closed and the other switches are opened. A reference pulse then appears at the output of the amplifier 20 and a voltage of equal magnitude appears at the junction of the switches 27 and 31. The capacitor 25 now begins to charge and the voltage at the switch junction begins to decay exponentially.

At times $t_3$, the reference pulse is removed but the switch 27 is still closed so that the junction of the switches 27 and 31 drops to a value below ground due to the sign of the charge still remaining on the capacitor 25. The capacitor 25 continues to discharge until the switch 27 opens. At this time the junction of the switches 27 and 31 is again at ground potential as it is no longer connected to the capacitor. During the remainder of the blanking pulse $t_3$–$t_4$, the sample pulse $t_4$–$t_5$, and the beginning of the next blanking pulse $t_5$–$t_6$, the switch junction remains at ground potential as the switch 27 remains open.

Shortly before time $t_6$, the switch 27 is closed, again connecting the switch junction with the capacitor 25 with the result that the switch junction drops to a value below ground due to the sign of the charge on the capacitor. The capacitor continues to discharge until the appearance of another reference pulse at the output of the amplifier 20 at time $t_6$. At the appearance of the reference pulse, the voltage at the switch junction rises an amount equal to the height of the reference pulse, but since the voltage at this point was below ground prior to the occurrence of the reference pulse, the potential at this junction rises to a voltage less than that at time $t_2$.

The capacitor 25 then begins to charge and the voltage at the switch junction begins to decay until time $t_7$ when the reference pulse ceases. The voltage at the switch junction then drops to a value less than ground due to the sign of the charge on the capacitor 25 and continues to decay until the switch 27 is opened. This switching operation is repeated as the mirror 13 is rotated until the area of the positive-going excursion and the sum of the areas of the negative-going excursions which immediately precede and follow it are equal with respect to ground potential. At this time, the maximum height of the positive excursion above ground will also be equal to the maximum height of the following negative excursion below ground. A train of reference signals compared to a known, fixed reference potential may thus be obtained. In the same fashion, the opening and closing of the switch 26 establishes a train of sample signals at the junction of switches 26 and 30. They are a certain voltage higher than the same known fixed reference potential, i.e., ground. The sample signals are, of course, established during the periods $t_4$–$t_5$, $t_8$–$t_9$, $t_{12}$–$t_{13}$, etc.

In the foregoing, it has been supposed that the influence of the switch 31, the resistor 33, and the capacitor 35 on the intermediary waveform at the junction of the switches 27 and 31 is negligible. This is true to a close approximation when resistor 33 is selected to have a very high value in comparison to resistor 29.

As is apparent from FIG. 5d, the switch 31 closes a short time after the appearance of the reference pulse and opens a short time before the output of the amplifier 20 returns to the blanking pulse level. During the portion of the period $t_2$–$t_3$ that switch 31 is closed, the voltage at the junction of resistor 33 and capacitor 35 rises exponentially as can be seen from FIG. 5f. As was the case when the rotating mirror of FIG. 2 was used, the resistor 33 and capacitor 35 form an integrating circuit while the switch 31 acts as a synchronous half-wave rectifier.

FIG. 5g shows the waveform appearing across the capacitor 35, from which it is apparent that the waveform at the junction of switches 27 and 31 is integrated by the RC combination 33 and 35 to form a close approximation of what would ideally be a square wave. The same integration takes place in the RC circuit 32, 35 with the result that two approximately square waves which are proportional to the intensity of the light beams passing through the reference and sample cells are impressed across the resistors 36 and 37. The remainder of the circuit acts in the same manner as described previously.

In the preceding descriptions of the circuit operation, it has been assumed that the reference and signal pulses appearing at the amplifier output in response to the reference and sample beams striking the detector are square waves. This is only approximately true because the detector and the amplifier have finite rise times and the optical beam switching does not take place instantaneously This slight distortion of input signals does not, however, materially affect the operation of the circuit as described.

It should be obvious that although mechanical switches have been shown, other forms of switches may be preferable in an actual instrument built according to the teachings of the present invention. For example, it may be found desirable to utilize switching diodes that are controlled by means of a radiation source and a mask which rotate with the shaft 15 of the mirror assembly.

This is a continuation-in-part of my application, Serial No. 716,443, filed February 20, 1958, assigned to the assignee of the present application and now abandoned.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In combination: means for generating a train of signal pulses of one polarity based upon a zero signal level having at least on occasion spurious noise impulses superimposed thereon, means for periodically selecting a portion of said train of pulses including at least a part of one signal pulse and at least a part of one zero signal level interval adjacent said one signal pulse in time, means for storing and filtering said zero signal interval portions to remove any spurious noise impulses and create true signal pulses, means for filtering and storing said true signal pulses, and means directing said stored signal pulses to a utilization circuit.

2. In combination: means for generating a train of signal pulses including a series of timed spaced pulses and a series of timed spaced zero signal level intervals having at least on occasion suprious noise signals superimposed thereon, means for periodically selecting a portion of said train of pulses including a substantial part of one signal pulse and a substantial part of at least one zero signal interval, means for storing and filtering said zero signal level interval portions to remove any spurious noise and create true signal pulses, and means for filtering and storing said periodically selected part of said one signal pulse to facilitate utilization thereof.

3. In combination: means for generating a train of signal pulses including a first series of time spaced signal pulses, a second series of time spaced signal pulses and a series of time spaced zero signal level intervals having at least on occasion spurious noise signals superimposed thereon, means for cyclically selecting a first portion of said train of signal pulses including at least a part of one of said first series of time spaced signal pulses and at least a part of one of said zero signal level intervals, means for cyclically selecting a second portion of said train of pulses including at least a part of one of said second series of time spaced pulses and at least a part of one of said zero signal intervals, means for separately storing and filtering said zero signal level intervals to remove any spurious noise and create corrected cyclically selected parts of said ones of said first and second series of time spaced pulses, and means for separately filtering and storing said corrected cyclically selected parts of said ones of said first and second series of time spaced pulses to facilitate utilization thereof.

4. In a signal comparison circuit for comparing the magnitudes of first signal pulses periodically generated in response to a reference condition and second signal pulses periodically generated in response to a condition to be measured, said first and second periodic signal pulses being generated alternately with respect to zero level intervals having at least on occasion spurious noise signals superimposed thereon, the combination comprising means for periodically selecting at least a portion of one of the first signal pulses and rejecting the second signal pulses and the zero signal level intervals, means for periodically selecting at least a portion of one of the second signal pulses and rejecting the first signal pulses and the zero signal level intervals, first and second means for referring separately each of said selected portions of the first and second signal pulses to the zero signal level to obtain corrected signal pulses proportional in magnitude respectively to the reference condition and the condition to be measured, means for separately storing each of said corrected signal pulses, and means for comparing the magnitudes of said corrected signal pulses.

5. A combination as in claim 4 in which the means for separately storing each of said corrected signal pulses includes a first resistor and a first capacitor connected in circuit for storing the first corrected signal pulses and a second resistor and a second capacitor connected in circuit for storing the second corrected signal pulses.

6. A combination as in claim 4 in which the means for separately storing each of said corrected signal pulses includes a first resistor and a first capacitor connected in circuit for storing the first corrected signal pulses and a second resistor and a second capacitor connected in circuit for storing the second corrected signal pulses, and said means for comparing the magnitudes of said corrected signal pulses including a first variable resistance element connected across said first capacitor and a second variable resistance element connected across said second capacitor.

7. A combination as in claim 6 wherein said periodic selecting means comprise mechanical selector switches.

8. A combination as in claim 7 wherein said means for referring separately each of said selected portions of the first and second signal pulses to the zero signal level comprises separately connected mechanical selector switches synchronously operated with respect to the first and second signal pulses.

9. A combination as in claim 7 in which said means for referring separately each of said selected portions of the first and second signal pulses to the zero signal level comprises mechanical selector switches separately connected in series with capacitors and synchronously operated with respect to the first and second signal pulses.

10. In a signal comparison circiut wherein recurrent time spaced first and second signal pulses from a signal source are compared to each other, the combination of a path for the first signal pulses comprising a first capacitor, a first switch means and a first resistor connected across the signal source, and second switch means, a second resistor and the parallel combination of a second capacitor and a first variable resistance means connected in circuit across said first resistor; a path for the second signal pulses in parallel with said path for the first signal pulses comprising a third capacitor, a third switch means and a third resistor connected across the signal source, and a fourth switch means, a fourth resistor and the parallel combination of a fourth capacitor and a second variable resistance means connected in circuit across said third resistor; signal comparison means connected to said first and second variable resistance means; and means operating said first and second switch means and said third and fourth switch means respectively in synchronism with the signal pulses whereby the first and second signal pulses are separately directed respectively along said first and second paths to said signal comparison means.

11. In a signal comparison circuit for continuously comparing a first and a second pulse, said pulses being departures from a blanking interval level, each of said pulses and said interval level forming separate parts of a repetitive cycle and together constituting a primary wave, the combination of: means for generating a first secondary wave, said first secondary wave being referred to a reference point and forming a repetitive sequence including a pulse that is derived from said first pulse; means for generating a second secondary wave, said second secondary wave being referred to said reference point and forming a repetitive sequence including a pulse that is derived from said second pulse; first and second synchronous demodulator means for respectively operating on said first and second secondary waves; first and second integrator means for respectively integrating the output of said first and second demodulators, and means for continuously comparing the outputs of said first and second integrator means.

12. A signal comparison circuit according to claim 11 in which each of the means for generating a secondary wave comprises in combination: a capacitor and a resistor in series, said capacitor being connected between a terminal carrying the primary wave and said resistor, said resistor connected between said capacitor and the reference point, and a selector switch operable to connect said capacitor and said resistor between said terminal and said reference point, said selector switch operable during at least part of the appearance of the respective one of said pulses in said primary wave and during at least part of the blanking interval.

13. A signal comparison circuit according to claim 11 in which said first and second synchronous demodulators each comprise a switch that closes during at least part of the appearance of the respective one of said pulses in said primary wave.

14. A signal comparison circuit according to claim 12 in which said first and second integrator means each comprises a resistor connected to the respective demodulator output and a capacitor that shunts the output of the integrator means.

15. In a signal comparison circuit for comparing a series of first pulses present in a waveform with a series of second pulses present in said waveform; first circuit means for removing said first pulses from said waveform, said first circuit means including means for comparing first signals derived from said first pulses with a reference point; second circuit means for removing said second pulses from said waveform, said second circuit means including means for comparing second signals derived from said second pulses with said reference point;

and output means, said output means including means for integrating said first and second signals and means for comparing said integrated signals.

16. In a signal comparison circuit for comparing a series of first pulses present in a waveform with a series of second pulses present in said wavefrom; means for establishing a reference potential; first circuit means, said first circuit means including means synchronized with said wavefrom for cyclically removing said first pulses from said waveform, said first circuit means also including means for deriving first signals from said first pulses and comparing said signals with said reference potential; second circuit means, said second circuit means including means synchronized with said waveform for cyclically removing said second pulses from said waveform, said second circuit means also including means for deriving second signals from said second pulses and comparing said signals with said reference potential; and output means, said output means including first and second integrating means for integrating said first and second signals, and means for comparing said integrated signals.

17. In a signal comparison circuit for comparing a series of first pulses present in a waveform with a series of second pulses present in said waveform, said pulses being departures from a blanking pulse level, said waveform being divided into repetitive cycles, each of said cycles including a first pulse, a second pulse and at least one blanking pulse; first circuit means for removing said first pulses from said waveform, said first circuit means including means for comparing first signals derived from said first pulses with a reference point; second circuit means for removing said second pulses from said waveform, said second circuit means including means for comparing second signals derived from said second pulses with said reference point; and output means, said output means including means for integrating said first and second signals and means for comparing said integrated signals.

18. In a signal comparison circuit for comparing first and second pulses present in a waveform in which said first and second pulses occur alternately and are separated by third pulses; first circuit means, said first circuit means including means synchronized with said waveform for cyclically removing said first pulses from said waveform, said first circuit means also including means for deriving first signals from said first pulses and comparing said signals with a reference potential; second circuit means, said second circuit means including means synchronized with said waveform for cyclically removing said second pulses from said waveform, said second circuit means also including means for deriving second signals from said second pulses and comparing said signals with said reference potential; first integrating means coupled to said first circuit means for integrating said first signals; second integrating means coupled to said second circuit means for integrating said second signals; and output means coupled to said first and second integrating means, said output means including means for comparing said integrated signals.

19. In a signal comparison circuit for comparing first and second pulses present in a waveform in which said first and second pulses occur altematively and are separated by third pulses; means to establish a reference potential; first circuit means, said first circuit means including switching means synchronized with said waveform for coupling said first circuit means to said waveform and said reference potential during the occurrence of a first pulse, said first circuit means also including means for derving first signals from said first pulses and comparing said signals with said reference potential; second circuit means, said second circuit means including switching means synchronized with said waveform for coupling said second circuit means to said waveform and said reference potential during the occurrence of a second pulse, said second circuit means also including means for deriving second signals from said second pulses and comparing said signals with said reference potential; first integrating means coupled to said first circuit means for integrating said first signals; second integrating means coupled to said second circuit means for integrating said second signals; and output means, said output means including means for comparing said integrated signal.

20. In a signal comparison circuit for comparing first and second pulses present in a waveform in which said first and second pulses occur alternately and are separated by third pulses; means for establishing a reference potential; first circuit means for deriving first signals from said first pulses and comparing said first signals to said reference potential, said first circuit means including means for coupling said first circuit means to said waveform and said reference potential during the occurrence of said first pulses; second circuit means for deriving second signals from said second pulses and comparing said second signals to said reference potential, said second circuit means including means for coupling said second circuit means to said waveform and said reference potential during the occurrence of said second pulses; output means coupled to said first and second circuit means, said output means including means for integrating said first and second signals and means for comparing said integrated signals.

21. A signal comparison circuit for comparing first and second pulses alternately produced by a signal generator, said signal generator also producing third pulses separating said first and second pulses, said circuit comprising in combination: means for establishing a reference potential; first circuit means, said first circuit means including switching means synchronized with said signal generator for coupling said first circuit means to said signal generator slightly before the occurence of each of said first pulses and decoupling said first circuit means from said signal generator slightly after the passage of said first pulse, said first circuit means also including means for deriving first signals from said first pulses and comparing said signals to said reference potential; second circuit means, said second circuit means including switching means synchronized with said signal generator for coupling said second circuit means to said signal generator slightly before the occurrence of each of said second pulses and decoupling said second circuit means from said signal generator slightly after the passage of said second pulse, said second circuit means also including means for deriving second signals from said second pulses and comparing said signals to said reference potential; a first integrating circuit coupled to said first circuit means for integrating said first signals; a second integrating circuit coupled to said second circuit means for integrating said second signals; and output means for comparing the outputs of said first and second integrating circuits.

References Cited by the Examiner

UNITED STATES PATENTS

| 2,451,572 | 10/48 | Moore | 88—14 |
| 2,551,833 | 5/51 | Ewing | 88—14 |
| 2,761,350 | 9/56 | Hornig | 88—14 |
| 2,787,512 | 4/57 | Pierstorff | 346—32 |
| 2,854,662 | 9/58 | Westwood | 324—83 |
| 2,868,060 | 1/59 | Akerman et al. | 88—14 |

ARTHUR GAUSS, *Primary Examiner.*

JEWELL H. PEDERSEN, *Examiner.*